(12) United States Patent
Cao et al.

(10) Patent No.: US 7,966,383 B2
(45) Date of Patent: Jun. 21, 2011

(54) CLIENT-SERVER SYSTEMS AND METHODS FOR ACCESSING METADATA INFORMATION ACROSS A NETWORK USING PROXIES

(75) Inventors: Wu Cao, Redwood City, CA (US); Sridhar Ganti, Alameda, CA (US); Vikram Kunniyur, Sunnyvale, CA (US); Duc Tran, San Jose, CA (US)

(73) Assignee: Business Objects Software Ltd. (IE)

( * ) Notice: Subject to any disclaimer, the term of this patent is extended or adjusted under 35 U.S.C. 154(b) by 175 days.

(21) Appl. No.: 12/413,268

(22) Filed: Mar. 27, 2009

(65) Prior Publication Data

US 2010/0250648 A1 Sep. 30, 2010

(51) Int. Cl.
G06F 15/167 (2006.01)
G06F 15/173 (2006.01)
(52) U.S. Cl. .......... 709/218; 709/223; 709/226
(58) Field of Classification Search .......... 709/223–224, 709/238, 249, 218, 226
See application file for complete search history.

(56) References Cited

U.S. PATENT DOCUMENTS

| | | | | |
|---|---|---|---|---|
| 6,119,143 A * | 9/2000 | Dias et al. | | 709/201 |
| 6,263,368 B1 * | 7/2001 | Martin | | 709/224 |
| 6,327,622 B1 * | 12/2001 | Jindal et al. | | 709/228 |
| 6,405,252 B1 * | 6/2002 | Gupta et al. | | 709/224 |
| 6,484,143 B1 * | 11/2002 | Swildens et al. | | 705/1.1 |
| 6,553,413 B1 * | 4/2003 | Leighton et al. | | 709/219 |
| 6,587,878 B1 * | 7/2003 | Merriam | | 709/224 |
| 6,820,133 B1 * | 11/2004 | Grove et al. | | 709/238 |
| 7,111,061 B2 * | 9/2006 | Leighton et al. | | 709/224 |

* cited by examiner

*Primary Examiner* — Hussein A Elchanti
(74) *Attorney, Agent, or Firm* — Fountainhead Law Group P.C.

(57) ABSTRACT

Embodiments of the present invention include a computer-implemented systems and methods for accessing metadata across a network. A metadata server receives requests to access a data source from one or more clients. The metadata server is coupled between one or more backend servers and the clients. The backend servers may be coupled to the data sources of interest. The metadata server provides a metadata service proxy for establishing communications with the backend servers and for signaling the backend servers to establish connections to data sources. Data sources may be stateful or stateless. For stateless data sources, the metadata server may dynamically create reusable metadata service provider proxies that receive metadata from metadata service providers on the backend servers. For stateful data sources, unique metadata service provider proxies may be dynamically created and used to service client requests.

20 Claims, 10 Drawing Sheets

CLIENT-SERVER SYSTEMS AND METHODS FOR ACCESSING METADATA INFORMATION ACROSS A NETWORK USING PROXIES

BACKGROUND

The present invention relates to computer software, and in particular, to client-server systems and methods for accessing metadata information across a network.

Current metadata discovery solutions involve each individual application having its own source metadata browsing and import functionality. The metadata information is generally not accessible across an enterprise network. So, each application implements its own solution which is inefficient. This also results in inconsistent and/or different source metadata information being imported from a data source individually by each application.

In an enterprise environment, there are multiple sub-divisions. For example, a corporation may have different departments such as human resources, finance, legal, etc. Each division represents a different business domain. Data is typically organized in tables by each domain. These tables are typically organized either in a hierarchical or "stateful" structure, or in a flat or "stateless" structure. Currently, browsing of metadata including, e.g., attributes, data types, data sizes, indexes, primary key columns, etc., involves scouring all of these different tables that are scattered across multiple different sub-divisions.

Thus, there is a need for a more universal and efficient solution for discovering and acquiring source metadata in an enterprise environment. The present invention solves these and other problems by providing client-server systems and methods for accessing metadata information across a network.

SUMMARY

Embodiments of the present invention include a computer-implemented systems and methods for accessing metadata across a network. A metadata server receives requests to access a data source from one or more clients. The metadata server is coupled between one or more backend servers and the clients. The backend servers may be coupled to the data sources of interest. The metadata server provides a metadata service proxy for establishing communications with the backend servers and for signaling the backend servers to establish connections to data sources. Connection to the data sources may be stateful or stateless. For stateless data sources, the metadata server may dynamically create reusable metadata service provider proxies that receive metadata from metadata service providers on the backend servers. For stateful data sources, unique metadata service provider proxies may be dynamically created and used to service client requests.

In one embodiment, the present invention includes a computer-implemented method of accessing metadata across a network comprising opening first and second connection paths from first and second clients, respectively, to a data source through a metadata server, browsing metadata from the data source by the first and second clients through the first and second connections paths, respectively, dynamically generating a first proxy for the first client at the metadata server for communicating with the data source, proxying a first request from the first client for a first subset of data from the data source over the first connection path through the first proxy, receiving, at the metadata server, metadata from said data source in response to the first request, sending to the first client a first response to the first request including the metadata, during the sending of the first response to the first request, receiving a second request from the second client for a second subset of data from the data source over the second connection path, and sending to the second client a response to the second request.

In one embodiment, the first and second connection paths share a first sub-connection path between the metadata server and the data source.

In one embodiment, the first sub-connection path comprises a second sub-connection path between the first proxy and the data source.

In one embodiment, the first and second connection paths comprise stateful connections to the data source including unique proxies for establishing data source connections, the method further comprising dynamically generating a second proxy for the second client at the metadata server for communicating with the data source, and proxying the second request from the second client for a second subset of data from the data source over the second connection path through the second proxy.

In one embodiment, the method further comprises auto-expiring the first proxy that has timed out and making the first proxy available for servicing a new connection request.

In one embodiment, the first and second connection paths comprise stateless connections to the data source through the first proxy, the method further comprising dynamically assigning the first proxy to the second client at the metadata server for communicating with the data source, and proxying the second request from the second client for a second subset of data from the data source over the second connection path through the first proxy.

In one embodiment, metadata from the data source is received in the metadata server in a plurality of chunks, and wherein at least a portion of the metadata chunks are stored in a buffer.

In one embodiment, the first proxy services the second request from the second client and metadata from the buffer is sent to the first client by said metadata server.

In one embodiment, the method further comprises load balancing data source connections across a plurality of remote servers, wherein a first remote server includes a first plurality of metadata service providers holding connections to a first data source, the first plurality of metadata service providers being in communication with a corresponding first plurality of dynamically generated metadata service provider proxies in said metadata server, and wherein a second remote server includes a second plurality of metadata service providers holding connections to a second data source, the second plurality of metadata service providers being in communication with a corresponding second plurality of dynamically generated metadata service provider proxies in said metadata server, and wherein said metadata server receives a request to access the first data source, and based on the loading of said first remote server, generates a new metadata service provider proxy on the metadata server and signals the second remote server to generate a new metadata service provider for connecting to said first data source and servicing said request through the new metadata service provider proxy.

In one embodiment, a first connection request is received by a metadata service proxy in the metadata server, and wherein the metadata service proxy generates said first proxy in response to said request, wherein said first proxy is a first service provider proxy, and wherein a first service provider is further generated on a second server for connecting to said data source and sending metadata to said first service provider proxy.

In one embodiment, a first connection request is received by a metadata service proxy in the metadata server, and wherein the metadata service proxy sends an open connection request to a metadata service on a second server coupled to the data source if a connection to the data source has not been created, and wherein the metadata service proxy sends a request to retrieve metadata from the data source through the first proxy if the connection to the data source has been created.

In one embodiment, the present invention includes a computer system for accessing metadata across a network comprising a server computer system and a metadata server software component executing one or more of the software components described below for performing the methods described herein.

In one embodiment, one or more computer-readable media are also provided having embedded therein computer-readable code to program one or more processors to perform any of the methods described herein accessing metadata information across a network.

The following detailed description and accompanying drawings provide a better understanding of the nature and advantages of the present invention.

DETAILED DESCRIPTION

Described herein are client-server systems and methods for accessing metadata over a network using proxies. The apparatuses, methods, and techniques described below may be implemented as a computer program (software) executing on one or more computers, such as a server. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
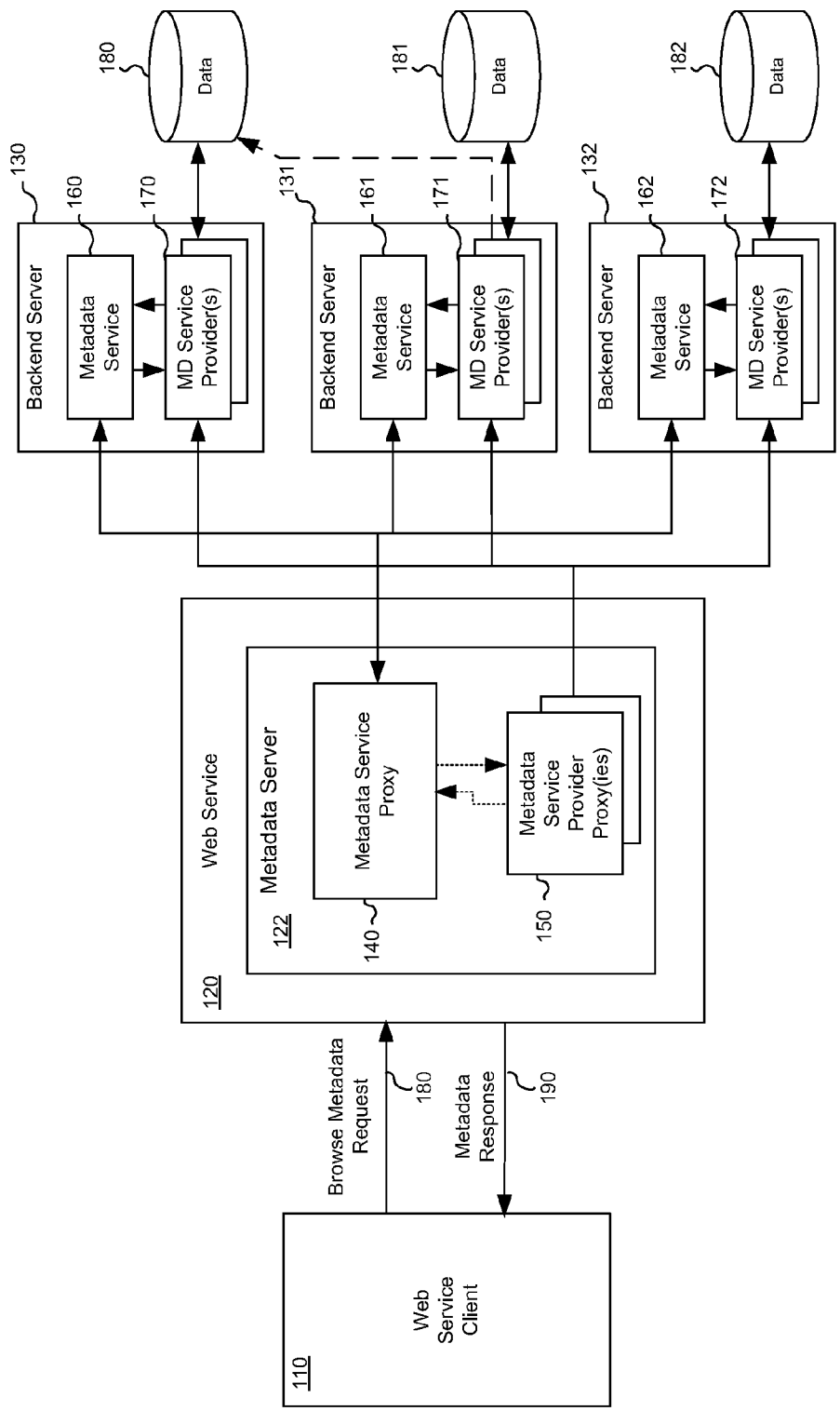
FIG. 1 illustrates a client-server system for accessing metadata information across a network.

FIG. 1 illustrates a high level diagram of a network that may be used for accessing metadata in accordance with certain embodiments. FIG. 1 shows a client 110 (e.g., a web service client), a web service 120 including a metadata server 122, and one or more backend servers 130-132 for accessing data sources 180-182 (e.g., a database on a hard drive or mass storage medium). The data sources 180-182 may be coupled to the backend servers 130-132 locally via a local bus or across a common network so that each server may access different data sources, for example. The metadata server 122 of FIG. 1 includes a metadata service proxy 140 for generating one or more metadata service provider proxies 150. The backend servers 130-132 of FIG. 1 may each include a metadata service 160-162 for generating one or more metadata ("MD") service providers 170-172 on each backend server. Metadata service providers 170-172 establish connections to data sources 180-182, respectively, and provide metadata back to one or more clients. As described in more detail below, metadata server 122 may provide load balancing of metadata requests across one or more different backend servers and corresponding metadata services, and may control the number of metadata service providers on each backend server to distribute the loading across different backend servers.

Client 110 may send a request 180 to browse metadata from a data source to the web service 120. The metadata service proxy 140 of the metadata server 122 of the web service 120 communicates connection information, which may include a request for creating new service providers to metadata services 160-162 of backend servers 130-132 and it also forwards requests for metadata to service provider 150 and gets back the metadata response and returns it to the client. For example, client 110 may send a request to metadata server 122 to access a data source, and if no existing connection has been opened to the data source, then metadata service proxy 140 will service this request by sending a request to metadata service 160 to create service provider 170 and metadata server proxy 140 will create the metadata service provider proxy 150 for the service provider 170. Once the service provider 170 and its proxy 150 have been created, proxy 150 may send an open connection request to metadata service provider 170 to open the data source connection, for example. In certain embodiments, connection information may include a connection string for accessing a particular data source. A data source connection string may include information about a data source, such as server name, user id, and/or password, for example. When a client wants to browse metadata of a data source, the client may send data source connection string information to metadata server 122 which will then forward the connection string to metadata service proxy 140, which may generate a metadata service provider proxy 150 and the metadata service provider 170 by means for metadata service 160. Metadata service provider proxy 150 may send a command to open the data source to metadata service provider 170. Metadata service provider 170 may create a connection to the data source 180 in response to the command. As described in more detail below, the request from client 110 may be examined by metadata server 122 to determine if the data source to be accessed is a stateful or stateless data source, and a metadata service provider and corresponding metadata service provider proxy may be shared across multiple clients if the data source is a stateless data source and multiple clients may each use a unique metadata service provider and corresponding metadata service provider proxy to access a data source if the data source is stateful. Once a connection to the data source is established, the metadata service provider proxy 150 of the metadata server 122 communicates specific metadata object requests and responses respectively to and from metadata service provider 170. The web service 120 returns a metadata response 190 to the client 110.

In FIG. 1, the web service client 110 may include a component responsible for generating XML requests for opening data source connections, browsing and/or importing metadata from the data sources 180-182 and/or receiving back XML responses from the web service 120.

The web service 120 may delegate a client's XML requests to the metadata server 122 and/or also deliver XML responses from the metadata server 122 back to the client 110.

The metadata service proxy 140 may communicate with the metadata service 160 on the side of the backend server 130 to create metadata service providers 170-172 when required or requested.

The metadata service provider proxy 150 may forward XML requests for opening or closing data source connections, browsing the data sources 180-182 for metadata to a metadata service provider on the server side. The provider proxy 150 may also return back XML responses received back from the server side.

The metadata services 160-162 on the server side may be responsible for managing the life cycle of the metadata service providers 170-172. It is to be understood that a metadata service a backend server may generate multiple metadata service providers for accessing the same or different data sources and servicing one or more clients.

The metadata service providers 170-172 may hold actual physical connections to the data sources. The metadata service providers 170-172 may process requests from the client 100 and return back responses in, e.g., XML.

Information that may be communicated as part of requests may include any of the following:
Connection information to Data Source which may contain information about the Database Server name, User ID, and/or Password.
Request for browsing and importing metadata which may contain information such as a unique ID generated for the client 110 by the Server 130, and/or a unique name of each metadata service providers 170-172.

The information that may be communicated as part of responses to the requests may include any of the following:
Response to browse requests and metadata import requests may contain information about different data source objects, a hierarchical ordering of the data source objects that are available, and/or metadata information about these objects.

In one embodiment, a service provider may service a client request for opening a connection and browsing metadata from a data source. Physical connection to a data source may be held by a service provider (e.g., providers 170-171 in FIG. 1). A proxy may be created for each service provider in the metadata server front end side and may be associated with the client by means of an entry in a client ID table. A service provider proxy will forward metadata browsing requests to the service provider and get the request serviced. When an open connection request comes to the metadata server and there are no idle service providers available that can be used to service the request, then a new service provider and its proxy may be created. Once a proxy has been created, the metadata server may associate a time period during which the proxy can remain active (e.g., the time period is configurable). Once a physical data source connection has been opened the connection remains active until one of the two actions takes place: a) the client closes the connection to the data source by sending a close connection request or b) the time period up to which the proxy can remain active has reached. When the data source connection needs to be closed, the service provider proxy will communicate to the service provider to close the physical connection. Thus the physical connection to the data source will be closed. After the physical connection is closed the service provider proxy will be removed from the Client ID table and placed in an idle list described in more detail below. Once the service provider proxy is in the idle list, it can be reused to open a new data source connection. Thus closing a data source connection may not mean that the connection between service provider and the service provider proxy are destroyed. It is only the physical data source connection held by the service provider that is closed.

Load Balancing

The metadata server 122 may balance the load of requests it receives for opening connections to data sources distributing the open requests among the back end servers by maintaining information about the number of active back end servers that have been created and the number of active service providers on each of those back end servers and the type of data sources to which they are connected to. For example referring to FIG. 1, if there are 3 back end servers 130, 131, and 132 respectively, where server 130 may be holding 60 active oracle connections, server 131 may be holding 60 active SAP connections, and server 132 may be holding 10 active Oracle connections. Each of the back end servers can hold a maximum of 80 active connections at any point of time. If the metadata server 122 receives request for opening 50 connections out of which 25 are SAP and 25 are Oracle, since server 132 is lightly loaded when compared to servers 130 and 131, the metadata server will make use of the backend server 132 to create the 25 SAP and 25 Oracle connections, thus balancing the connections among the back end servers. When a greater or smaller number of contemporaneous requests are to be handled, the metadata server 122 determines when to open another back end server, and when to close a back end server and consolidate open requests on the remaining available back end servers. The metadata server utilizes load balancing to provide a more efficient system for browsing metadata across an enterprise.

Stateful Connection

Figure 2:
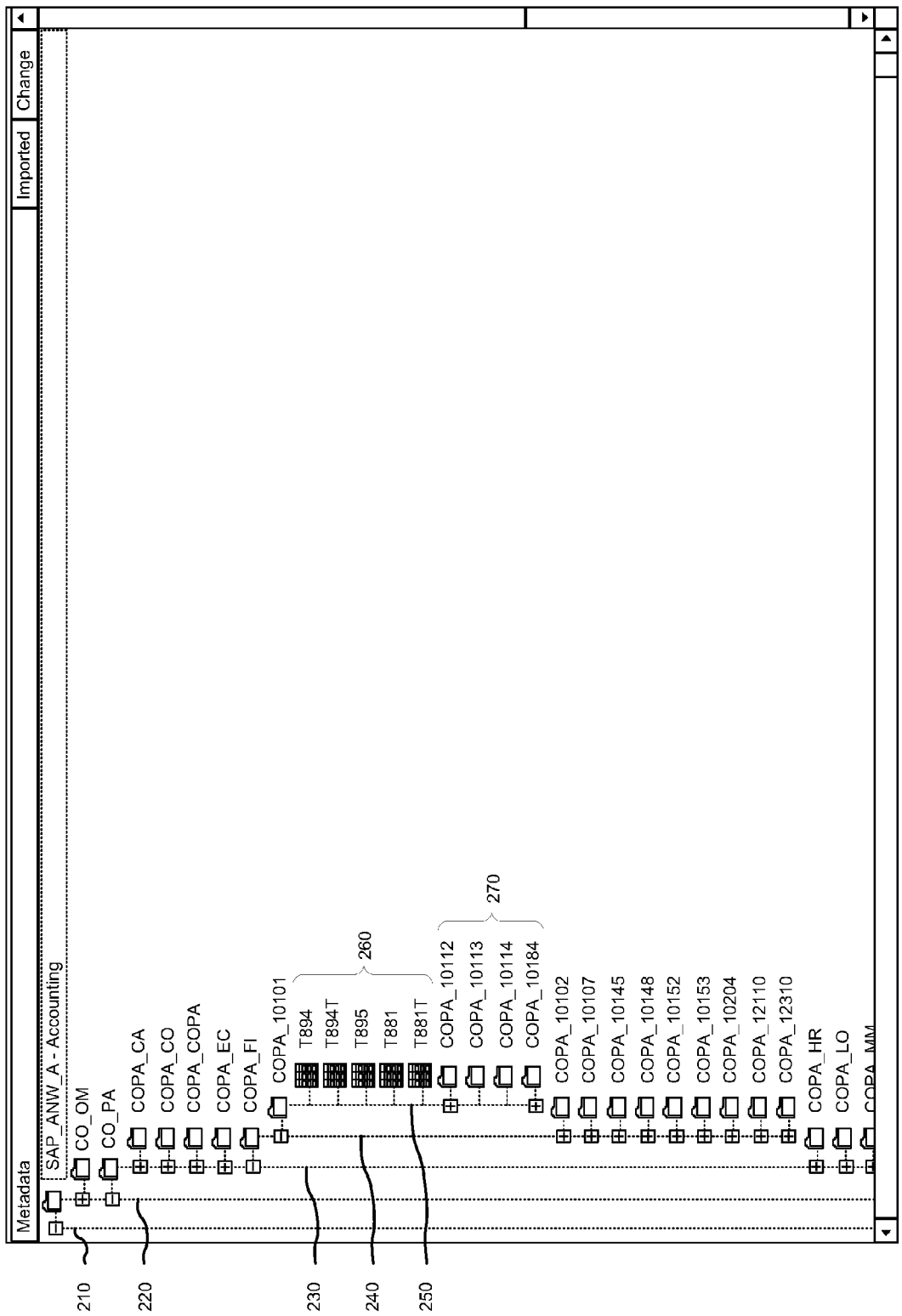
FIG. 2 illustrates levels of a hierarchical data store which may be browsed through a stateful connection in accordance with certain embodiments.

A stateful connection may include a connection to a data source for which browsing requests are associated with some state information. For example, a connection to SAP may be considered to be a stateful connection, because in SAP certain data store objects are grouped based on different application domains. Browsing the data source will therefore involve some kind of state information such as which level in the hierarchy the user is browsing. Referring to FIG. 2, multiple levels 210, 220, 230, 240 and 250 are represented with file names such as SAP_ANW_A-Accounting at level 210, CO_PA at level 220, COPA_FL at level 230, COPA__10101 at level 240 and COPA__10112 at level 250, wherein level 250 includes files 260 and folders 270.

FIG. 2 illustrates a SAP R/3 via DS designer that may be browsed according to a hierarchical structure. For example, the highest level 210 shown in the example of FIG. 2 is labeled SAP_ANW_A—Accounting. Below the highest level 210 is a second level 220 with objects labeled CO_OM—AM Overhead Controlling and CO_PA_AM Profitability Analysis. A third level 230 under the Profitability Analysis object includes several objects. A fourth level 240 is shown in FIG. 2 under an object of the third level 230 labeled COPA_FI—CO-PA Finance. A fifth level 250 is shown in FIG. 2 under an object of the fourth level 240 labeled COPA_10101—Ledger. Objects in this fifth level 250 include several data objects 260, as well as several further folders 270 each having one or more further sub-levels.

Stateless Connection

A stateless connection may include a connection to a data source for which browsing requests are not associated with any state information. For example, a connection to Oracle may be considered to be a stateless connection, because in Oracle there is generally no hierarchical grouping of data store objects. A significant distinction between stateful and stateless connections is that stateless connection can be shared while a stateful connection may not generally be shared.

Figure 3:
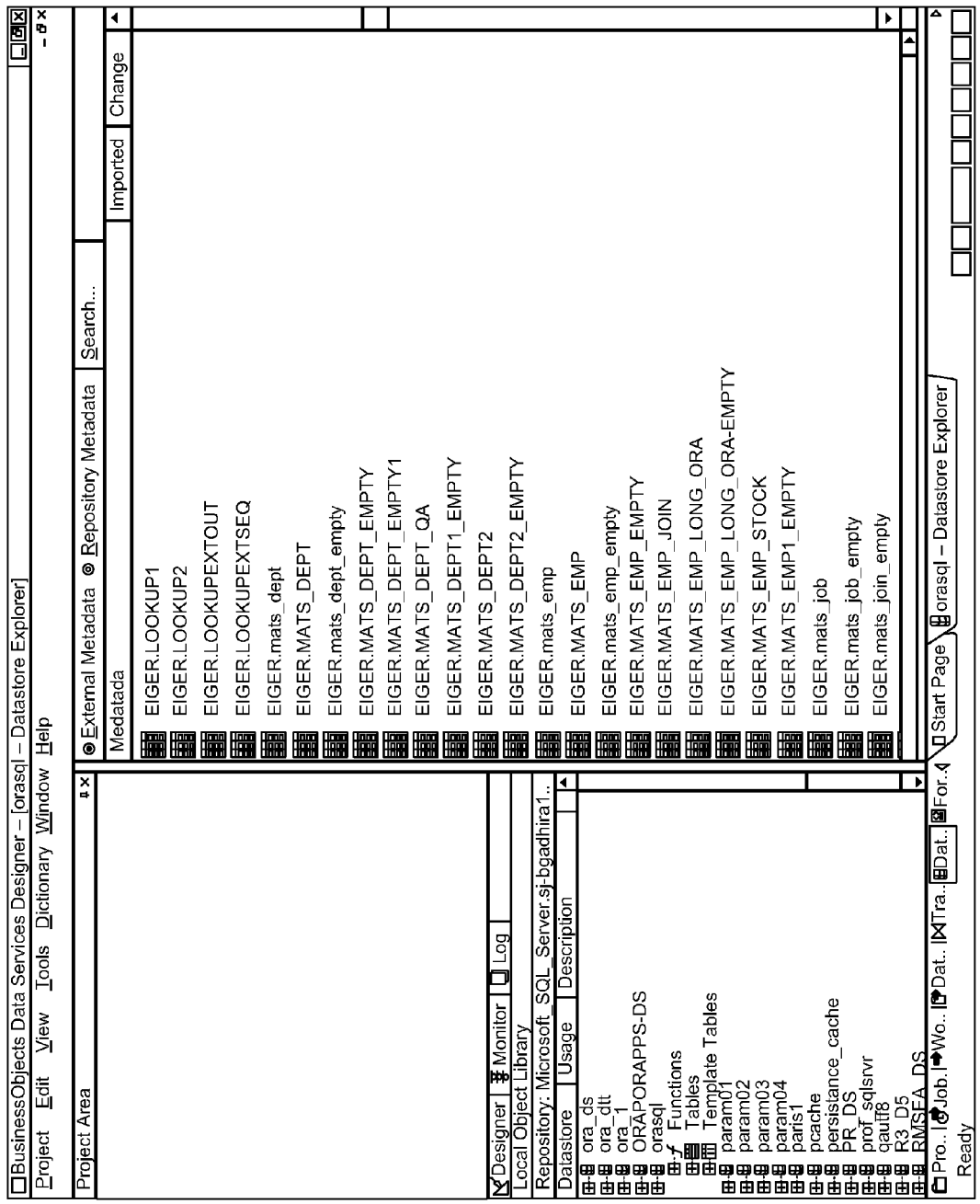
FIG. 3 illustrates a data store that may be browsed through a stateless connection in accordance with certain embodiments.

FIG. 3 illustrates a flat, non-hierarchical database that may be browsed according to a flat structure. That is, all of the data objects are provided on a same level each without associated folders nor sub-folders, and without associated lower-level nor higher level objects.

Figure 8:
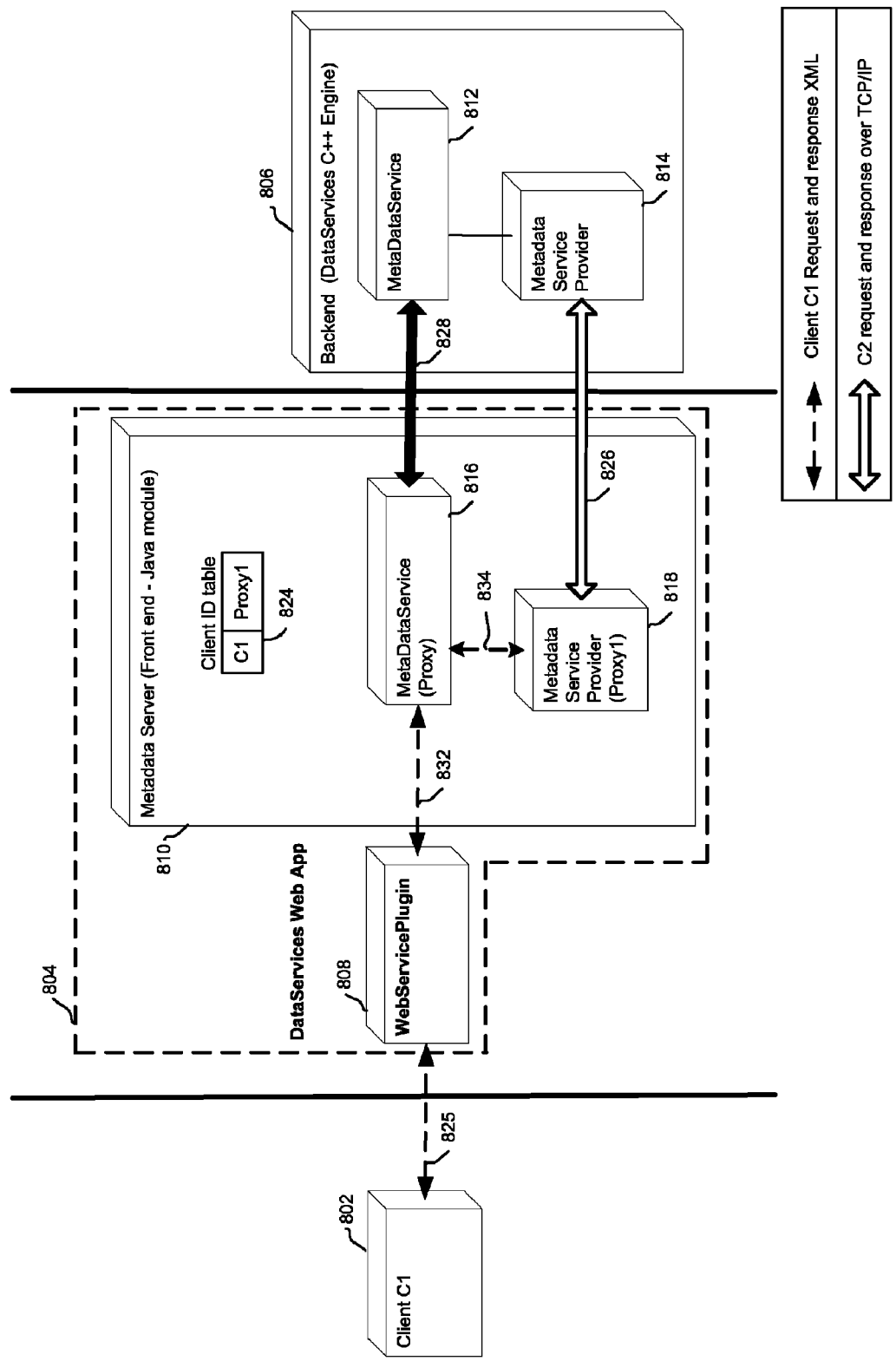
FIG. 8 illustrates a first stateful connection to a backend metadata service using a first proxy of a metadata server by a first client in accordance with certain embodiments.
Figure 9:
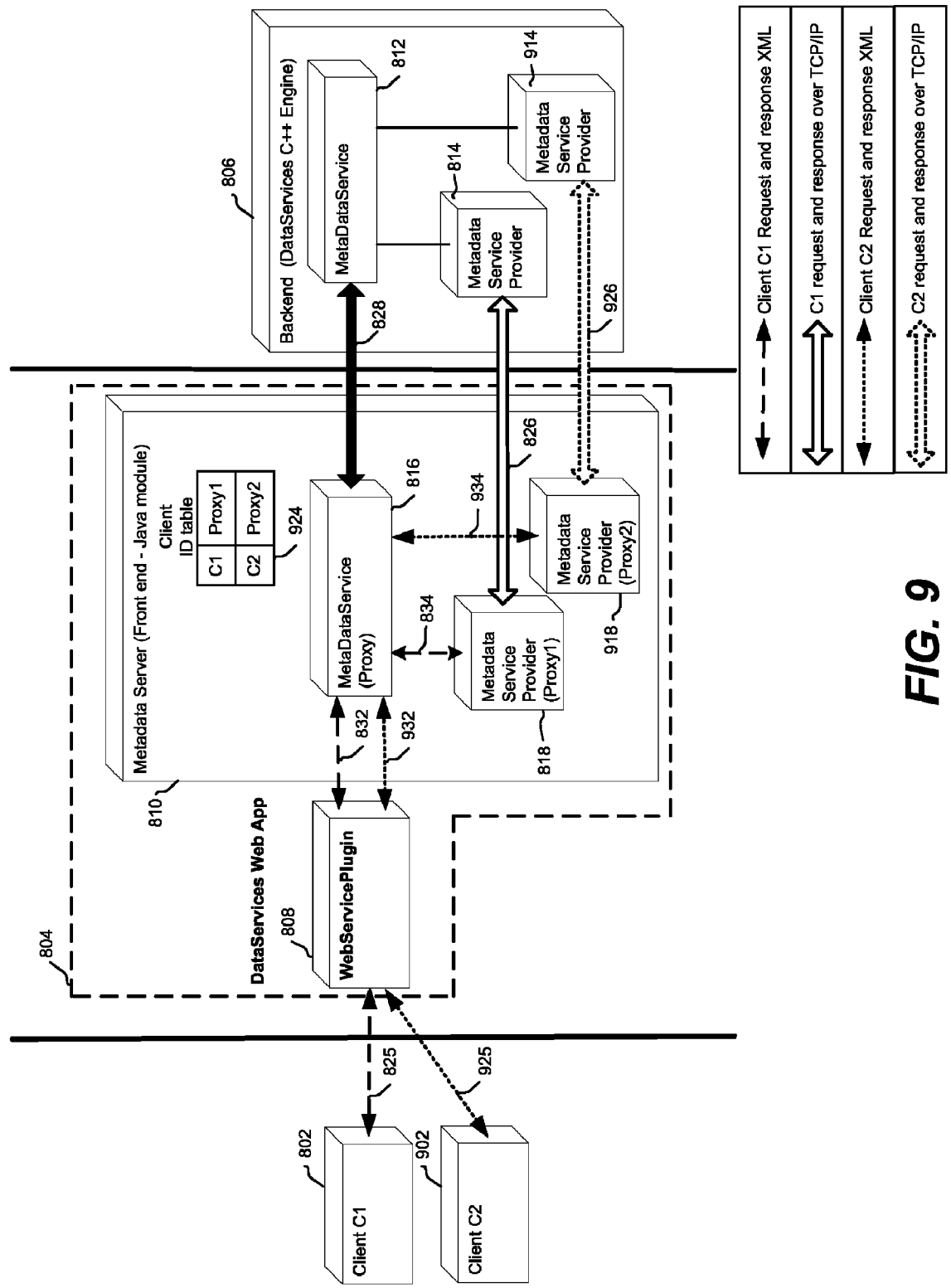
FIG. 9 illustrates a second stateful connection to the backend metadata service of FIG. 8 using a second proxy of the metadata server of FIG. 8 by a second client in accordance with certain embodiments.

FIG. 4-7 illustrate non-exhaustive examples of how metadata requests and responses for a stateless connection may be handled. FIGS. 8-9 are described further below and illustrate the handling of stateful connections in accordance with certain embodiments.

Stateless Network

Figure 4:
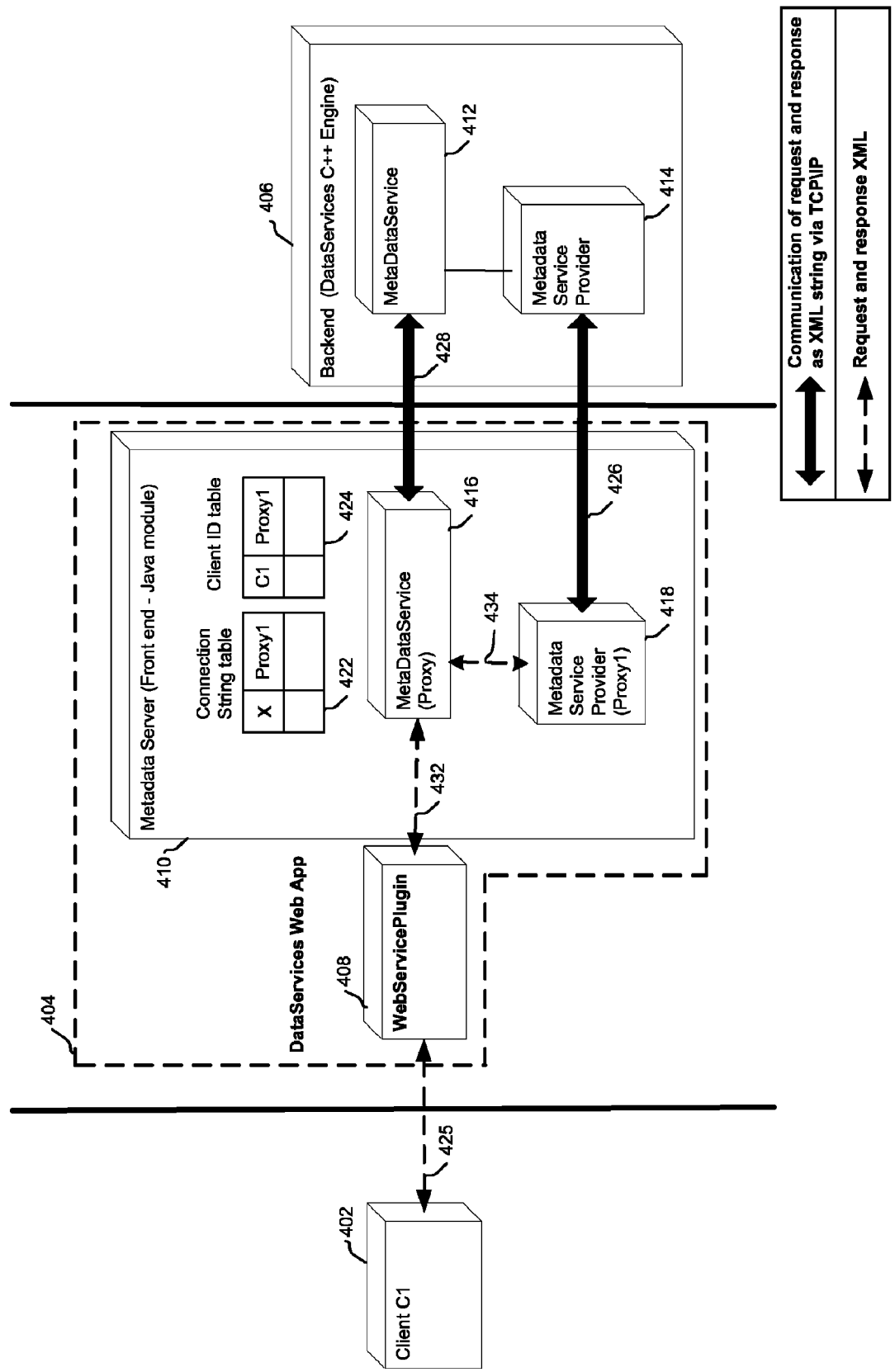
FIG. 4 illustrates a metadata server using a proxy to service client request for browsing metadata from a data source.

FIG. 4 illustrates software components and a process for handling a stateless connection in accordance with certain embodiments. The system includes a first client C1 402, a data services web application 404 and a backend data service 406. The data services web application 404 includes a web service plugin 408 and a metadata server 410. The backend data service 406 includes a metadata service 412 and a metadata service provider 414. The metadata server 410 includes a metadata service proxy 416 and a metadata service provider proxy 418. The metadata service proxy 416 of the metadata server 410 provides a service provider proxy for the client C1 402 with the metadata service 412 of the backend metadata service 412. The metadata server 410 maintains a connection string table 422 and a client ID table 424.

Metadata server 410 may store information for managing connection paths between one or more clients and one or more data sources through service provider proxies and service providers. For example, metadata server 410 may include a Client ID Table 424 and a connection string table 422. Client ID Table 424 may hold information about the client ID and the corresponding service provider proxy servicing this client. Connection string table 424 may be used for handling stateless connections, for example. Connection string table may contain information about the connection string of the data source and a list of service providers holding those connections so that service providers may be shared by multiple clients, for example. Additionally, as described in more detail below, metadata server 410 may include an Idle List and a BufferHolder Table. The Idle List may contain the list of service provider proxies that are in idle state and are available for servicing any new open connection requests. The BufferHolder Table may contain a Client ID and reference to the buffer where chunked responses for a client can be found as described in more detail below.

As mentioned above, the Client ID table 424 may associate a particular client with a particular metadata service provider proxy. The connection string table 422 maintains a mapping between particular connection strings and particular metadata service provider proxies. Using this information, each client's service provider proxy and connection may be tracked and managed.

As there may be multiple backend servers and/or multiple data sources, it is advantageous for different clients to be able to connect to a data source through the same metadata server 410 to access many backend data services containing the data and metadata that the different clients may be looking for.

The metadata server 410 manages connections to backend data services such as 406 and perhaps others by using one or more proxies. For example, as mentioned above, metadata service proxy 416 is used by metadata server 410 to communicate with service 412 to create service provider 414 which will create a physical connection to data source for which the client may browse metadata. Metadata service proxy 416 may also create service provider proxy 418. For the example of stateless connections illustrated at FIGS. 4-7, metadata server 410 also may use service provider proxy 418 and service provider 414 to connect another client C2 to the same data source for browsing metadata. However, in the example of stateful connections illustrated at FIGS. 8-9, metadata server 810 uses metadata service provider proxy 818 to connect client C1 to service provider 814 which holds the physical connection to a data source for which the client C1 is browsing metadata, while metadata server 810 uses metadata service provider proxy 918 to connect client C2 to service provider 914 which holds another physical connection to the data source for which the client C2 is browsing metadata.

As mentioned above, metadata server 410 determines and opens an efficient path to backend source 406 one or more proxies. Additionally, metadata server 410 may store connection information in the connection string table 422 along with the reference to service provider proxy and store a client ID in table 424 with the reference to the associated service provider proxy. That is, by referring to tables 422 and 424, and for example buffer holder table 644 which is described below, metadata server 410 is able to more efficiently service the requests 425 of client C1 and other client requests, rather than determining and opening connections to backend data sources and potentially many others each time a new request is received with overlapping connection information. Many other criteria may be included in the set of tables that include tables 422, 424 and 644, e.g., that may be specific to certain applications, protocols, bandwidths, ISPs, securities, passwords, encryption services, selective content blockers, or government, work-related or voluntary monitoring programs, among potentially other criteria specifically being run at, for or in relation to one or more clients and/or at backend servers 406 and/or some required or otherwise used intermediate entity.

In the example of the connection path between client C1 402 and backend server 406 through metadata server 410 of FIG. 4, client C1 402 is illustrated as requesting that a connection be opened to a stateless data source with connection string X.

In this example, client C1 402 sends a request using across communication channel 425 to the data services web app 404. The channel 425 may use simple object access protocol or SOAP over the hyper text transfer protocol or HTTP, for example. The client C1 402 then expects to receive a response to the request from the data services web app over the same channel 425. Metadata service proxy 416 of metadata server 410 communicates with metadata service 412 of backend data service 406 by connection 428 to create metadata service provider/provider proxy pairs. Metadata service proxy 416 then routes requests through service provider proxy 418, across channel 426, to metadata service provider 414 to open a connection and return metadata from the data source. The metadata server 410 may communicate with client C1 402 through web service plugin 408 over channel 432 which may involve XML strings. XML strings refer to requests and responses for XML information which are stored as strings.

The metadata service proxy 416 has advantageous functionality. For example, proxy 416 can be used to launch backend 406 to create metadata service 412 in the backend. Proxy 416 can also handle requests for opening connections to the data sources. Proxy 416 can send a message to metadata service 412 to create a new service provider 414 as described above. Proxy 416 can also create the service provider proxy 418. The service provider 414 then can open an actual physical connection to the data source. The proxy 416 can also forward metadata browsing requests to corresponding service provider proxies by accessing a Client ID table to determine the proxy. Proxy 416 may further receive connection requests from other clients and use table 422 to determine if an existing connection may be shared using an existing provider proxy/provider pair.

The metadata service provider proxy 418 also has advantageous functionality. One function of service provider proxy 418 is to act as a proxy for service provider 414 and to forward requests to service provider 414 and to return back responses received from service provider 414 to proxy 416.

The metadata service 412 is configured to service requests from proxy 416 for creating one or more metadata service providers 414. Metadata service 412 also manages terminations for service provider 414.

The metadata service provider 414 contains the actual physical connection to the data source. Metadata service provider 414 opens connections to the data source, browses the data source for data source objects, and retrieves metadata information of data source objects. Metadata service provider 414 also closes connections to the data source.

In general, communication channels 426 and 428 may involve communications of requests and responses as XML strings via TCP/IP or transmission control protocol over internet protocol. Also, channels 425 and 432, as well as a channel 434 between metadata service 416 and metadata service provider 418 of metadata server 410, may involve requests and responses with XML or extensible markup language.

Figure 5:
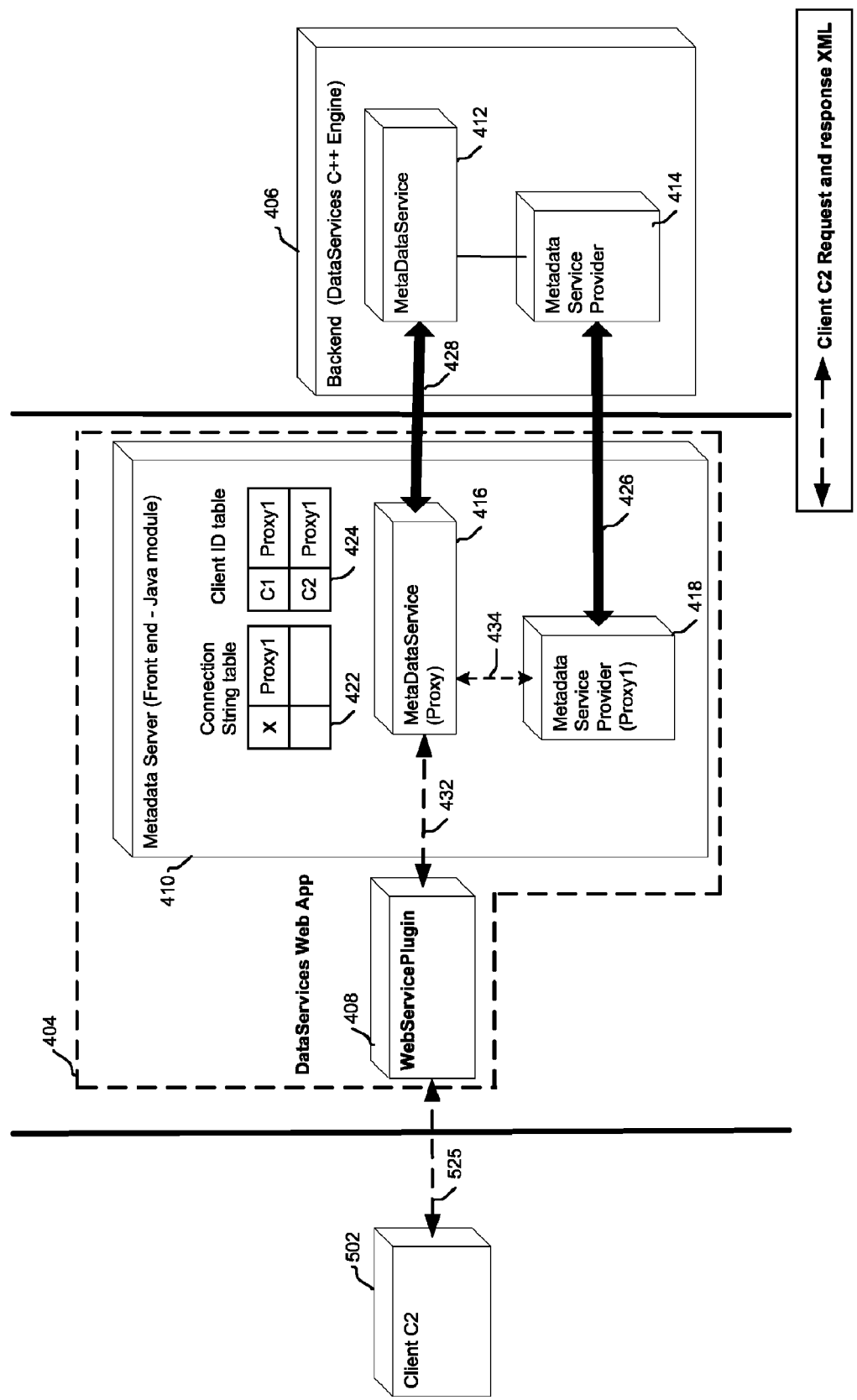
FIG. 5 illustrates the use of the same proxy of the metadata server by a second client.

FIG. 5 illustrates another client C2 502 accessing data from the same data source through metadata server 410, metadata service proxy 416, and metadata service provider proxy 418. Features and advantages of the present invention include sharing provider proxies and service providers to stateless data sources. For example, after client C1 402 requests metadata known to metadata server 410 to involve connection string X, whereby metadata is requested and received from stateless a data source through metadata server 410, a connection may be opened for client C2 502 to stateless data source 406 using the same connection string X and the same service provider proxy 418. In this regard, initially, client C2 502 sends a request for opening a data source connection with connection string X to data services web app 404 over channel 525 which may use SOAP over HTTP. Client C2 502 then expects to receive a response over channel 525 from web service plugin 408.

In the example of FIG. 5, web service plug in 408 communicates with metadata service proxy 416 of metadata server 410 over channel 432, just as with that of client C1. Metadata service proxy 416 communicates with metadata service 412 over channel 428. Metadata service provider proxy 418 communicates with metadata service provider 414 over channel 426. Metadata service provider proxy also communicates with metadata service proxy 416 over channel 434. Each of these channels are the same request/response paths as with the FIG. 4 example involving client C1 402. In fact, client C1 402 and client C2 502 may be connected simultaneously over these channels to backend data service 406. Metadata service proxy 416 uses the service provider proxy "proxy 1" 418 for both client C1 402 and client C2 502 to communicate with metadata service provider 414 over channel 426. The table 424 reflects that client C1 402 and client C2 502 each use proxy 1. In other words, different clients may access the same data source by sharing a metadata service provider proxy and a metadata service provider having a connection to the data source. As connection string X which uses proxy 1 418 is used to establish a data source connection for both client C1 402 and client C2 502, connection string table 422 reflects only that connection string X uses proxy 1.

Figure 6:
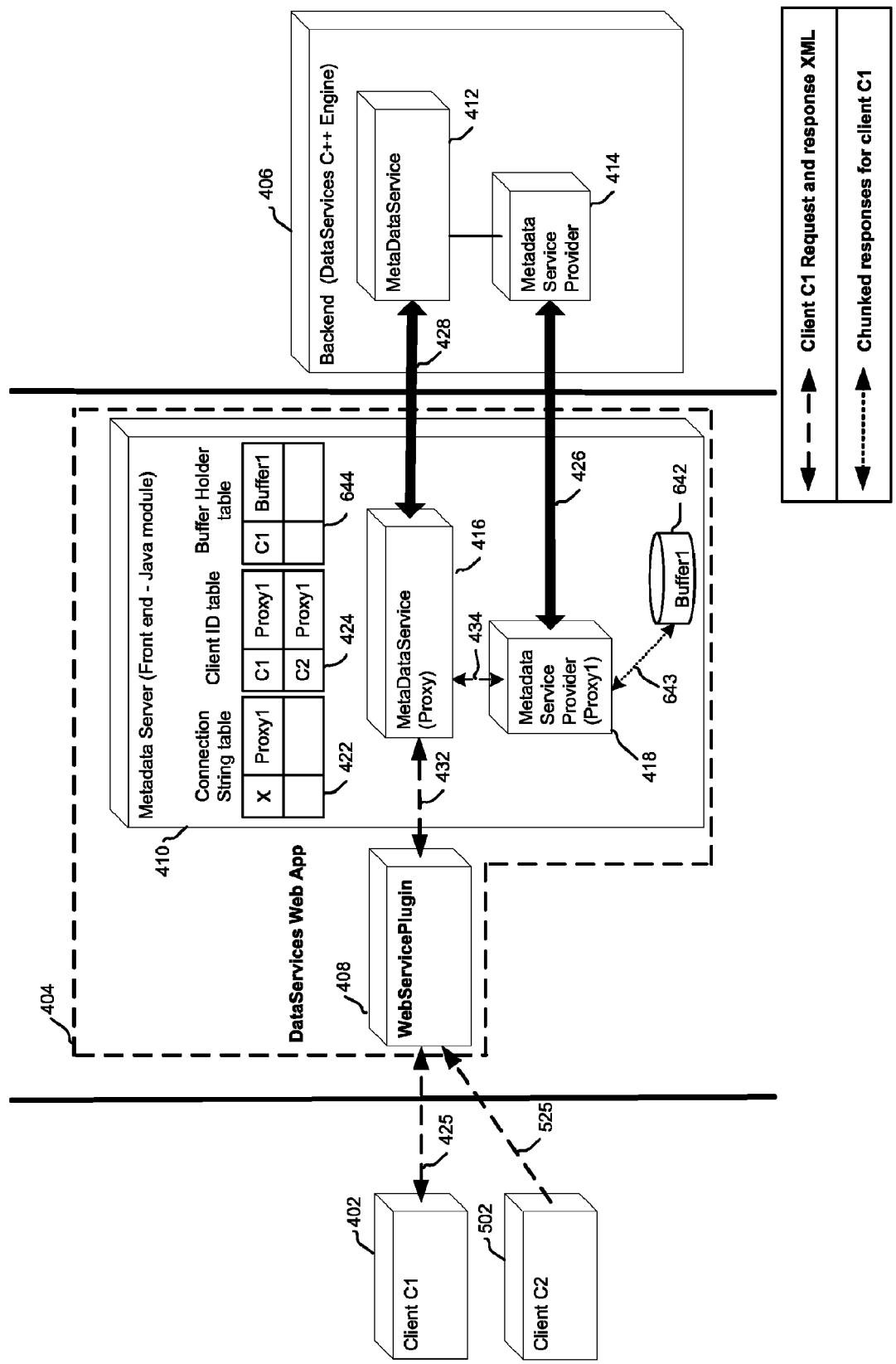
FIG. 6 illustrates retrieval and buffering of metadata at the metadata server in response to a request by the first client of FIG. 4 in accordance with certain embodiments.

FIG. 6 illustrates multiple clients sharing a connection to a stateless data source through a metadata server according to an embodiment of the invention. Here, an example of a request sent by client C1 402 over channel 425 to data services web app 404 is next described. Web service plugin 408 communicates the request received from client C1 402 over channel 432 to metadata service proxy 416 of metadata server 410 and to metadata service provider 418 through metadata service proxy 416.

There may generally be no difference between the communication between 416-418 and 408-416. One difference between communications between 416-412 and 416-418 or 408-416 may be that communication between 416-412 occurs between two different processes that take place over TCP/IP, whereas the communication between 416-418 or 408-416 occur within a single process since the may be on the same server, for example.

With regard to channels 426 and 428, communications by channel 426 usually will contain requests for opening data source connections, browsing and importing metadata, and closing data source connections, while communications by channel 428 typically contain messages for creating a new service provider or shutting down a service provider.

There is also a communication channel between 412 and 414. This channel may be used so service 412 can manage the life cycle of 414 (e.g., to create and shutdown provider 414 on the backed end). The channel 434 differs in that channel 434 involves forwarding XML requests and XML responses between service 416 and provider proxy 418. These may be two-way communications, whereas the channel between service 412 and provider 414 may be one-way.

Metadata service provider proxy 418 of metadata server 410 communicates with metadata service provider 414 of backend 406 which responds to the request by sending the requested metadata information over channel 426.

For example, client C1 may send a request to metadata server 410 to browse metadata information for 100 objects in the data source to which it has opened a connection. When the metadata server is servicing Client C1, a new Client C2 may send a request to open a connection to the data source with exactly the same connection string "X" (e.g., data base name: "payroll_database", usename: "sa", password: "pass123"). Metadata Server 410 may service the open connection request of client C2 simultaneously while it services Client C1. First, client C1 402 may send a browse request. Since it is a request for browsing metadata, metadata service 416 may directly look up the client ID in table 424 to find out the service provider proxy 418 associated with client 402, which is used to service the request. The Client ID table may indicate that service provider proxy 418 ("Proxy 1") should be used for client C1 402. Accordingly, provider proxy 418 will service the request by sending the request to service provider 414, which will process the request.

Metadata service provider 414 may retrieve data from the data source and send the data back in response packets (i.e., chunks). Response packets may include dividing the total data set into equal or approximately equal portions and sending the portions (chunks) to from the metadata service provider 414 to the metadata service provider proxy 418. This process is also referred to as "chunking" or "packetizing" the data. The chunks may also contain XML information and perhaps not network related headers or pay-load information. Chunking may or may not be used in specific instances depending on the nature of size of the response that is to be communicated based on processing the client request. For responses that are sufficiently small in size, chunking may not take place.

Provider proxy 418 may receive an indicator in the first response from provider 414 that the data is being sent in chunks. Accordingly, when proxy 418 receives the response it will know whether the response it received is a chunked response or a complete response. When the response is chunked, the proxy 418 may receive the first chunk from the back end and send it to the client, thus making sure that the client receives the first chunk immediately. In the mean time proxy 418 may perform a background operation which will quickly get all the chunks that belong to the response from the provider 414 and store it in a buffer 642. Accordingly, proxy 418 stores the chunks in a buffer 642 when the chunks are received from provider 414. The buffer that is created may be associated with the Client ID by adding the Client ID ("C1") and a reference to buffer in the Buffer Holder table 644.

Figure 7:
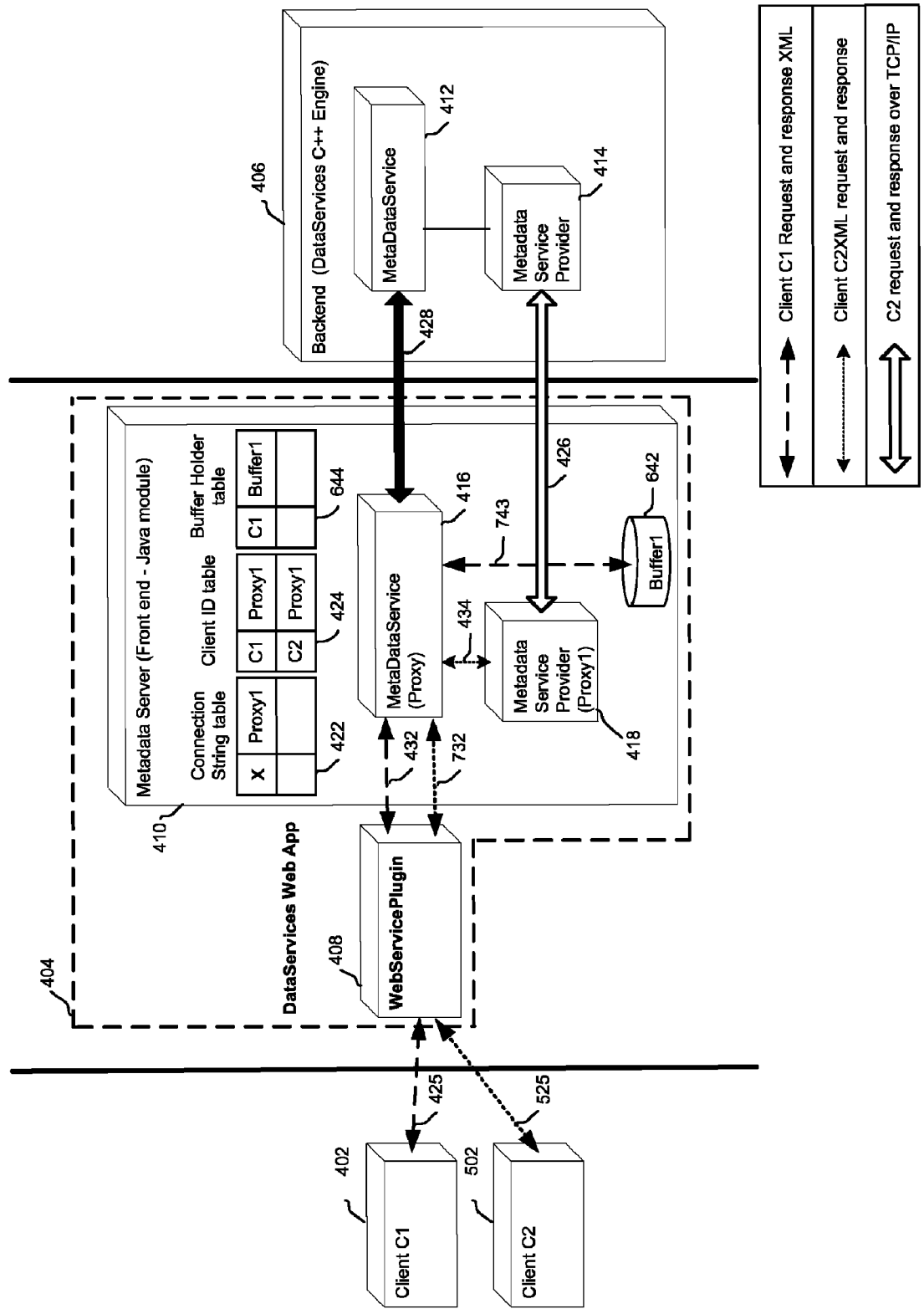
FIG. 7 illustrates retrieval of data for the second client of FIG. 5.

Referring now to FIG. 7, client C1 402 starts to receive "chunked" responses, or sub-parts of the entire response which is broken up into multiple parts or "chunks" of the entire response as broken up portions of responses in multiple batches. During the above-described request and response, client C2 502 continues to be connected to web service plugin over channel 525 and to backend source 406 over channels 426 and 428, as described above with reference to FIG. 5.

Client C2 502 may browse metadata for the same data source that client C1 402 is browsing. Accordingly, client C2 502 sends an XML request for opening a data source connection. If client C2 502 sends the same connection string 'X' (e.g., data base name: "payroll_database", usename: "sa", password: "pass123"), then the provider proxy/provider connection to the data source may be reused by client C2 502. For example, metadata service proxy 416 may check the connection string table 422 to determine if there is an entry for the connection string received from client C2 502. Since there is a matching entry (i.e., connection string X) indicating that a service provider proxy is available for that data source connection, metadata service 416 may not create any new service provider proxies. Rather, a unique ID for client C2 502 may be generated and an entry will be stored in Client ID table 424 that will contain the unique ID together with a reference to the service provider proxy that is present in the connection string table. For example, table 424 may store a unique ID for client C2 502, which is associated with provider proxy 418 ("Proxy 1"). Since proxy 1 is already associated with connection string X in table 422, requests and responses with client C2 502 may be serviced using metadata service provider proxy 418 and metadata service provider 414, thus re-using the existing connection.

In FIG. 7, Client C1 402 has made requests to metadata server 410 to access data and the chunked responses have been buffered. At the same time client C2 502 sends a request to browse metadata for 3 objects from the data source, for example. Here, client C1 402 and client C2 502 are reusing the channel to the data source and metadata server 410 is responsive to client C2 502 by processing requests from client C2 502 immediately and not waiting until request for client C1 402 has been serviced completely. Metadata server 410 may service both these clients simultaneously as follows. As mentioned above, client C1 402 may receive an initial chunked response, with the remaining chunked responses being stored in buffer 642. Thereafter, client C1 402 may send a request to fetch the remaining chunked responses. When metadata server 410 receives the request to fetch the chunked responses, it may service this request by directly looking up the entries Buffer holder table 644 and retrieve the next chunk for the client C1 402 from buffer 642 using communication channel 743. In this example, service provider proxy 418 is not used for servicing the request for retrieving the chunked responses from the buffer. Thus, proxy 418 is available to service client C2 502. As mentioned above, client C2 502 may send a browse request. Since it is a request for browsing metadata, metadata service 416 may look up an entry in the client ID table 424 to determine if an existing service provider proxy may be used to service the request. In this example, the client ID table 424 indicates that for client C2 502 the service provider proxy 418 may be used, and hence proxy 418 will service the request by sending it to metadata service provider 414. Metadata service provider 414 may process the request and send the response back to proxy 418. Here, the response from provider 414 may be a complete response, and hence the complete response is returned back to client C2 502. If the response was chunked then same set of operations that took place for client C1 402 in FIG. 6 will take place to process the chunked response using the buffer and Buffer Holder table, for example.

Stateful Network

FIG. 8 illustrates a process for handling a stateful connection in accordance with certain embodiments. Referring to FIG. 8 in a stateful connection example, client C1 802 opens a connection to a stateful data source 806 with connection string "X", and starts browsing metadata. The network includes a first client C1 802, a data services web application 804, and a backend data service 806. The data services web application 804 includes a web service plugin 808 and a metadata server 810. The backend data service 806 includes a metadata service 812 and a metadata service provider 814. The metadata server 810 includes a metadata service 816 and a metadata service provider proxy 818. The metadata service 816 of the metadata server 810 provides a proxy for the client C1 802 with the metadata service 812 of the back end data service 806.

The metadata server 810 maintains a client ID table 824. The client ID table 824 maintains a mapping between clients and the proxies that the metadata server uses to communicate with backend source 806.

In the example of the connection of client C1802 to backend data service 806 through metadata server 804 of FIG. 8, client C1 802 sends a request using a communication channel 825 to the data services web app 804. The channel 825 may use simple object access protocol or SOAP over the hyper text transfer protocol or HTTP. The client C1 802 then expects to receive a response to the request from the data services web app over the same channel 825. Metadata service 816 of metadata server 810 communicates with metadata service 812 of backend data service 806 by channel 828 to create a metadata service provider 814. Metadata service 816 of metadata server 810 provides proxy 1 818 to communicate by channel 826 with metadata service provider 814 of metadata service 812. Provider 814 creates a connection to a data source. The metadata server 810 may communicate with client C1 802 through web service plugin 808 over connection 832 which may involve XML strings.

In general, channels 826 and 828 may involve communications of requests and responses as XML strings via TCP/IP or transmission control protocol over internet protocol. Also, channels 825 and 832, as well as a channel 834 between metadata service 816 and metadata service provider proxy 818 of metadata server 810, may involve requests and responses with XML or extensible markup language.

Referring now to FIG. 9 in continuing this stateful connection example, client C2 902 may send a request to open a connection the same data source that Client C1 has connected to with the connection string "X". Since the stateful connections will not be shared the Metadata server connects client C2 to the a data source by creating a new service provider/provider proxy pair 914-918, respectively, even though a connection has already been opened for connection string X, and starts browsing metadata information. Thus, client C2 is connected to the data source via metadata service provider proxy 918 and metadata service provider 914, which respectively differ from proxy1 818 and metadata service provider 814 through which client C1 is able browse selected metadata.

In the example of FIG. 9, client C2 902 sends a request using a channel 925 to the data services web app 804. The channel 925 may use simple object access protocol or SOAP over the hyper text transfer protocol or HTTP. The client C2 902 then expects to receive a response to the request from the data services web app over the same channel 925. Metadata service 816 of metadata server 810 provides proxy2 918 to communicate by channel 926 with metadata service provider 914 of metadata service 912. Metadata service 816 of metadata server 810 otherwise communicates with metadata service 812 of backend data service 806 by channel 828. The metadata server 810 may communicate with client C2 902 through web service plugin 808 over channel 932 which may involve XML strings.

In general, channel 926 may involve communications of requests and responses as XML strings via TCP/IP or transmission control protocol over internet protocol. Also, channels 925 and 932, as well as a channel 934 between metadata service 816 and metadata service provider 918 of metadata server 810, may involve requests and responses with XML or extensible markup language.

In this stateful example, two different proxies, proxy1 818 and proxy2 918 are used to communicate respectively over connections 826 and 926 to metadata service providers 814 and 914 of backend data service 806. Client ID table 924 is updated to reflect that proxy1 is used to service the request of client C1, while proxy2 is used to service the request of client C2.

For both clients C1 802 and C2 902, processing requests to access stateful data sources may be handled in the same manner. For example, client C1 802 may send a request to browse metadata for a stateful data source (e.g., SAP). Accordingly, client C1 802 sends an XML request for opening a data source connection. Metadata service proxy 816 identifies that the request is for a stateful connection (e.g., by identifying the database or other information in the request from the client), and since a stateful connection will not be shared it process the request as follows. First, metadata server 810 may look up entries in the idle list table, which may include a list of idle service provider proxies that have been created. If any service provider proxy is available in the idle list, then it may be remove from idle list and used to process the open connection request. If no service provider proxies are in the idle list, then a new service provider 814 on back end and corresponding service provider proxy 818 on the front end may be generated for processing the open connection request. A unique ID for the client may be generated and stored as part of the client's response. For example, the unique ID and a reference to the service provider proxy may be stored in a client ID table as described above. The response may be sent back to the client and future responses processed by looking up entries in the client ID table.

In both the stateless and stateful connection examples, the number of connections to the data service 806 are reduced compared to a conventional system not utilizing metadata server 404, 804. In the stateless example, connections 428 and 426 are used to service the requests of both client C1 402 and client C2. In the stateful example, connection 828 is used to service the requests of both client C1 802 and client C2 902. As the costs of providing metadata service increase with the number of connections, expenses are reduced in both examples. Moreover, by using buffer1 642 in the stateless example, data retrieval is reduced lowering expenses further.

Computer Network

Figure 10:
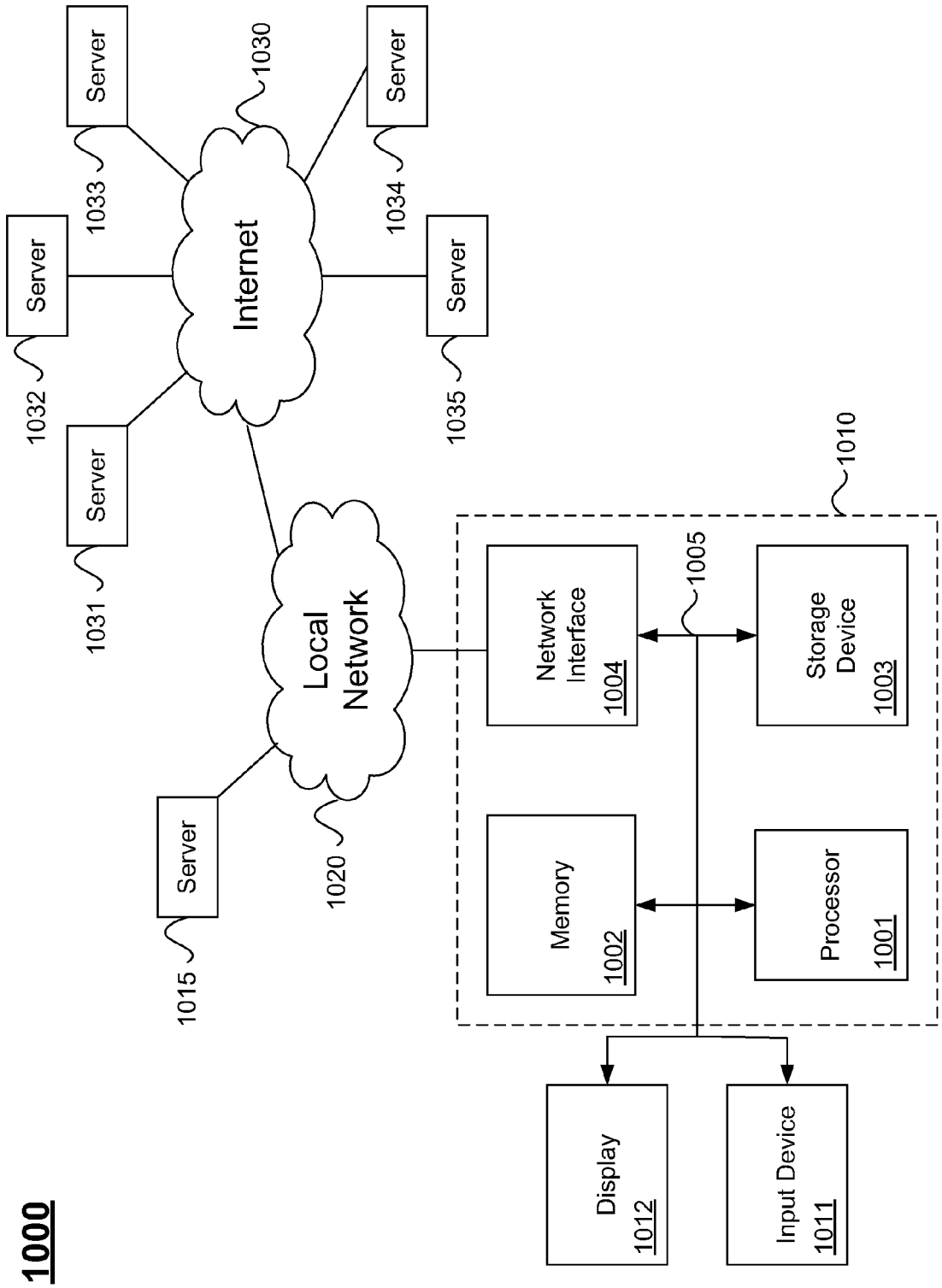
FIG. 10 illustrates an example computer system and networks including multiple components that, alone and/or in combination with other components, may be useful for implementing certain software processes.

FIG. 10 illustrates a simplified diagram of a hardware system for implementing processes according to certain embodiments. Computer system 1010 includes one or more buses 1005 or other communication mechanism for communicating information, and one or more central processing units ("CPUs" or "processors") 1001 coupled with bus 1005 for processing information. Central processing units on different computers may be configured to perform the functions described above. Computer system 1010 also includes one or more memories 1002 coupled to bus 1005 for storing information and instructions to be executed by processors 1001, including information and instructions for performing the techniques described above, for example. This memory may also be used for storing variables or other intermediate information during execution of instructions to be executed by processors 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques or embodying the constructs above, for example.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 1004 sends and receives electrical, electromagnetic, or optical signals that carry digital data streams representing various types of information.

Computer system 1010 can send and receive information, including messages or other interface actions, through the network interface 1004 to a local network, Intranet, or the Internet 1030. Software components or services described above may reside on multiple different computer systems 1010 or 1015 across a local network or servers 1031-1035 across the network. The processes described above may be implemented on one or more servers, for example. A server may transmit actions or messages from one component, through local network 1020 or Internet 1030, to network interface 1004 to a component on computer system 1010. Different processes may be implemented on any computer system and send and/or receive information across a network, for example. In one embodiment, the techniques describe above may be implemented by software services on one or more servers 1031-1035, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

In addition, in methods that may be performed according to the claims below and/or embodiments described herein, the operations have been described in selected typographical sequences. However, the sequences have been selected and so ordered for typographical convenience and are not intended to imply any particular order for performing the operations, unless a particular ordering is expressly indicated or understood by those skilled in the art as being necessary.

What is claimed is:

1. A computer-implemented method of accessing metadata across a network, comprising:
   opening first and second connection paths from first and second clients, respectively, to a data source through a metadata server, wherein opening the first connection path comprises:
      communicating, via a metadata service proxy of the metadata server, with a metadata service of a backend server to have a metadata service provider created in the backend server, wherein the metadata service provider connects to the data source for the first connection path;
      dynamically generating a first metadata service provider proxy for the first client at the metadata server for communicating with the data source through the metadata service provider;
   proxying a first request from the first client for a first subset of data from the data source over the first connection path, wherein the first request is proxied through the first metadata service provider proxy and the metadata service provider of the first connection path;
   receiving, at the metadata server, metadata from the data source in response to the first request;
   sending to the first client a first response to the first request including the metadata;
   during the sending of the first response to the first request, receiving, at the metadata server, a second request from the second client for a second subset of data from the data source over the second connection path; and
   sending, via the metadata server, the second subset of data from the data source to second client in a second response to the second request.

2. The method of claim 1, wherein the first and second connection paths share a first sub-connection path between the metadata server and the data source.

3. The method of claim 2, wherein the first sub-connection path comprises a second sub-connection path between the first metadata service provider proxy and the data source.

4. The method of claim 1, wherein the first and second connection paths comprise stateful connections to the data source including unique metadata service provider proxies, wherein the metadata service provider comprises a first metadata service provider, the method further comprising:
   dynamically generating a second metadata service provider proxy for the second client at the metadata server for communicating with the data source;
   communicating, via the metadata service proxy of the metadata server, with the metadata service of the backend server to have a second metadata service provider created in the backend server, wherein the second metadata service provider connects to the data source for the second connection path; and
   proxying the second request from the second client for the second subset of data from the data source over the second connection path, wherein the second request is proxied through the second metadata service provider proxy and the second metadata service provider of the second connection path.

5. The method of claim 4, further comprising auto-expiring the first metadata service provider proxy that has timed out and making the first metadata service provider proxy available for servicing a new connection request.

6. The method of claim 1, wherein the first and second connection paths comprise stateless connections to the data source through the first metadata service provider proxy, the method further comprising dynamically assigning the first metadata service provider proxy to the second client at the metadata server for communicating with the data source, and proxying the second request from the second client for the second subset of data from the data source over the second connection path, wherein the second request is proxied through the first metadata service provider proxy and the metadata service provider.

7. The method of claim 6, wherein metadata from the data source is received in the metadata server in a plurality of chunks, and wherein at least a portion of the metadata chunks are stored in a buffer.

8. The method of claim 7, wherein the first metadata service provider proxy services the second request from the second client and metadata from the buffer is sent to the first client by said metadata server.

9. The method of claim 1, further comprising load balancing data source connections across a plurality of backend servers, wherein a first backend server includes a first plurality of metadata service providers holding connections to a first data source, the first plurality of metadata service providers being in communication with a corresponding first plurality of dynamically generated metadata service provider proxies in the metadata server, and wherein a second backend server includes a second plurality of metadata service providers holding connections to a second data source, the second plurality of metadata service providers being in communication with a corresponding second plurality of dynamically generated metadata service provider proxies in the metadata server, and wherein the metadata server receives a request to access the first data source, and based on the loading of said first backend server, generates a new metadata service provider proxy on the metadata server and signals the second backend server to generate a new metadata service provider for connecting to the first data source and servicing the request through the new metadata service provider proxy.

10. The method of claim 1, wherein a first connection request is received by the metadata service proxy in the metadata server, and wherein the metadata service proxy generates the first metadata service provider proxy in response to said the first connection request, wherein the first metadata service provider is further generated on the backend server for connecting to the data source and sending metadata to the first metadata service provider proxy.

11. The method of claim 1, wherein a first connection request is received by the metadata service proxy in the metadata server, and wherein the metadata service proxy sends an open connection request to the metadata service on the backend server coupled to the data source if a connection to the data source has not been created, and wherein the metadata service proxy sends a request to retrieve metadata from the data source through the first metadata service provider proxy and the metadata service provider if the connection to the data source has been created.

12. A computer system for accessing metadata across a network comprising:
  a server computer system coupled to a network;
  a metadata server software component, executable on said server computer system, said metadata server software component:
  opening first and second connection paths from first and second clients, respectively, to a data source through a metadata server, wherein opening the first connection path comprises:
    communicating, via a metadata service proxy of the metadata server, with a metadata service of a backend server to have a metadata service provider created in the backend server, wherein the metadata service provider connects to the data source for the first connection path;
    dynamically generating a first metadata service provider proxy for the first client for communicating with the data source through the metadata service provider;
  proxying a first request from the first client for a first subset of data from the data source over the first connection path, wherein the first request is proxied through the first metadata service provider proxy and the metadata service provider of the first connection path;
  receiving metadata from the data source in response to the first request;
  sending to the first client a first response to the first request including the metadata;
  during the sending of the first response to the first request, receiving, at the metadata server, a second request from the second client for a second subset of data from the data source over the second connection path; and
  sending, via the metadata server, the second subset of data from the data source to the second client in a second response to the second request.

13. The computer system of claim 12, wherein the first and second connection paths comprise stateful connections to the data source including unique metadata service provider proxies, wherein the metadata service provider comprises a first metadata service provider, the method further comprising:
  dynamically generating a second metadata service provider proxy for the second client at the metadata server for communicating with the data source;
  communicating, via the metadata service proxy of the metadata server, with the metadata service of the backend server to have a second metadata service provider created in the backend server, wherein the second metadata service provider connects to the data source for the second connection path; and
  proxying the second request from the second client for the second subset of data from the data source over the second connection path, wherein the second request is proxied through the second metadata service provider proxy and the second metadata service provider of the second connection path.

14. The computer system of claim 12, wherein the first and second connections comprise stateless connections to the data source through the first metadata service provider proxy, the method further comprising dynamically assigning the first metadata service provider proxy to the second client at the metadata server for communicating with the data source, and proxying the second request from the second client for the second subset of data from the data source over the second connection path, wherein the second request is proxied through the first metadata service provider proxy and the metadata service provider of the first connection path.

15. The computer system of claim 14, wherein metadata from the data source is received in the metadata server in a plurality of chunks, and wherein at least a portion of the metadata chunks are stored in a buffer.

16. The computer system of claim 15, wherein the first metadata service provider proxy services the second request from the second client and metadata from the buffer is sent to the first client by said the metadata server.

17. The computer system of claim 12, wherein a first connection request is received by the metadata service proxy in the metadata server, and wherein the metadata service proxy sends an open connection request to the metadata service on the backend server coupled to the data source if a connection to the data source has not been created, and wherein the metadata service proxy sends a request to retrieve metadata from the data source through the first metadata service provider proxy and the metadata service provider if the connection to the data source has been created.

18. A non-transitory computer readable medium embodying a computer program for performing a method of accessing metadata across a network, said method comprising:
  opening first and second connection paths from first and second clients, respectively, to a data source through a metadata server, wherein opening the first connection path comprises:
    communicating, via a metadata service proxy of the metadata server, with a metadata service of a backend server to have a metadata service provider created in the backend server, wherein the metadata service provider connects to the data source for the first connection path;

dynamically generating a first metadata service provider proxy for the first client at the metadata server for communicating with the data source through the metadata service provider;

proxying a first request from the first client for a first subset of data from the data source over the first connection path, wherein the first request is proxied through the first metadata service provider proxy and the metadata service provider of the first connection path;

receiving, at the metadata server, metadata from the data source in response to the first request;

sending to the first client a first response to the first request including the metadata;

during the sending of the first response to the first request, receiving, at the metadata server, a second request from the second client for a second subset of data from the data source over the second connection path; and sending, via the metadata server, the second subset of data from the data source to the second client in a second response to the second request.

19. The computer readable medium of claim 18, wherein the first and second connection paths comprise stateful connections to the data source including unique metadata service provider proxies, wherein the metadata service provider comprises a first metadata service provider, the method further comprising:

dynamically generating a second metadata service provider proxy for the second client at the metadata server for communicating with the data source;

communicating, via the metadata service proxy of the metadata server, with the metadata service of the backend server to have a second metadata service provider created in the backend server, wherein the second metadata service provider connects to the data source for the second connection path; and proxying the second request from the second client for the second subset of data from the data source over the second connection path, wherein the second request is proxied through the second metadata service provider proxy and the second metadata service provider of the second connection path.

20. The computer readable medium of claim 18, wherein the first and second connections comprise stateless connections to the data source through the first metadata service provider proxy, the method further comprising dynamically assigning the first metadata service provider proxy to the second client at the metadata server for communicating with the data source, and proxying the second request from the second client for the second subset of data from the data source over the second connection path, wherein the second request is proxied through the first metadata service provider proxy and the metadata service provider.

* * * * *